(12) United States Patent  
Naraya

(10) Patent No.: US 6,515,847 B1
(45) Date of Patent: Feb. 4, 2003

(54) SOLID ELECTROLYTE CAPACITOR AND ITS MANUFACTURING METHOD

(75) Inventor: Kazunori Naraya, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 09/806,181

(22) PCT Filed: Sep. 29, 1999

(86) PCT No.: PCT/JP99/05323

§ 371 (c)(1),
(2), (4) Date: Mar. 28, 2001

(87) PCT Pub. No.: WO00/19468

PCT Pub. Date: Apr. 6, 2000

(30) Foreign Application Priority Data

Sep. 30, 1998 (JP) ............................................. 10-276925
Sep. 30, 1998 (JP) ............................................. 10-276926

(51) Int. Cl.[7] ................................................. H01G 9/00
(52) U.S. Cl. ........................ 361/523; 361/528; 361/508; 361/509; 361/516; 29/25.03
(58) Field of Search ................................. 361/523, 525, 361/504, 509, 516, 502, 512, 511, 528, 529, 508, 503, 532; 29/25.03

(56) References Cited

U.S. PATENT DOCUMENTS

| | | | | |
|---|---|---|---|---|
| 4,970,626 A | * | 11/1990 | Kakinoki et al. | 361/512 |
| 5,628,801 A | * | 5/1997 | Macfarlane et al. | 29/25.03 |
| 5,754,394 A | * | 5/1998 | Evans et al. | 361/516 |
| 5,914,852 A | * | 6/1999 | Hatanaka et al. | 361/523 |
| 6,166,899 A | * | 12/2000 | Tamamitsu | 361/504 |
| 6,208,503 B1 | * | 3/2001 | Shimada et al. | 361/523 |
| 6,229,689 B1 | * | 5/2001 | Kobayashi et al. | 361/525 |

FOREIGN PATENT DOCUMENTS

| JP | 3150825 | 6/1991 |
|---|---|---|
| JP | 9293639 | 11/1997 |

* cited by examiner

*Primary Examiner*—Anthony Dinkins
*Assistant Examiner*—Nguyen T Ha

(57) ABSTRACT

Using as the cathode foil, an etched aluminum foil with TiN film formed thereon by cathode arc plasma deposition process and using as the anode foil, an etched aluminum foil with a dielectric film formed on the surface thereof, as produced by subjecting the surface of the etched aluminum foil to a chemical treatment by a method of related art. Winding the anode foil together with the cathode foil and a separator, a capacitor element is formed; then immersing the capacitor element with EDT monomer and additionally with 40% to 60% ferric p-toluenesulfonate, the resulting capacitor element is heated at 20° C. to 180° C. for 30 minutes or more. Subsequently, the surface of the capacitor element is coated with a resin, for aging.

31 Claims, 3 Drawing Sheets

SOLID ELECTROLYTE CAPACITOR AND ITS MANUFACTURING METHOD

TECHNICAL FIELD

The present invention relates to a solid electrolytic capacitor and a method for producing the same. More specifically, the invention relates to a solid electrolytic capacitor with modifications for the purpose of improving the capacitance occurrence ratio by reducing the equal serial resistance (referred to as ESR hereinafter) and for making the resulting capacitor into a small size.

BACKGROUND OF THE INVENTION

Electrolytic capacitors using valve action metals such as tantalum or aluminum, are widely used, because such electrolytic capacitors can be made into small sizes and can also generate large capacitance, owing to the enlargement of the area of the dielectric material via the shaping of the valve action metal as the counter electrode on the anode side into sintered material or etched foil. Particularly, solid electrolytic capacitors using solid electrolytes as the electrolytes have characteristic properties such as facility of chip formation and suitability for surface mounting, in addition to small type, large capacitance and low ESR. Therefore, such solid electrolytic capacitors are indispensable for the production of small-sized, highly functional electric devices at low cost.

For such type of small-sized solid electrolytic capacitor for use for large capacitance, generally, the capacitor element therein is produced by winding together an anode foil and a cathode foil via a separator, both the foils comprising a valve action metal such as aluminum, impregnating the capacitor element with a driving electrolytic solution and placing the capacitor element in a case made of metals such as aluminum or a case made of synthetic resins such that the resulting capacitor has a sealed structure. Further, aluminum, tantalum, niob and titanium are used as the anode material, while metals of the same kind as those for the anode material are used as the cathode material.

So as to increase the capacitance of electrolytic capacitor, importantly, the capacitance of the cathode material as well as the capacitance of the anode material should be improved. The capacitance of each of the electrodes of electrolytic capacitor is defined by the type and thickness of an insulation film formed on the electrode surface and the surface area of the electrode. Given that the dielectric constant of insulation film is $\in$; the thickness of insulation film is t; and the surface area of electrode is A, the capacitance C is expressed by the following equation.

$$C=\in(A/t)$$

So as to increase the capacitance, as shown by the equation, it is effective to enlarge the electrode surface area, select an insulation film material with a high dielectric constant and produce a thin insulation film.

Among them, simple use of large electrode so as to enlarge the electrode surface area is not preferable, because such use only makes the resulting electrolytic capacitor into a large size. Thus, the surface of aluminum foil as a fundamental material for electrodes has traditionally been etching processed to form recesses and protrusions thereon to substantially enlarge the surface area.

Additionally, Japanese Patent Laid-open No. 167009/1984 discloses a cathode material with a metal film formed on the surface of the base material by utilizing the metal deposition technique, as an alternative of the etching process. According to the technique, film-forming conditions should be selected, so as to enlarge the surface area by forming microfine recesses and protrusions on the film surface to yield a large capacitance. Additionally, metals exerting high dielectric constants in the form of oxides thereof, such as Ti, can increase the dielectric constant of the insulation film formed on the surface of the cathode material, leading to a larger capacitance.

Furthermore, Japanese Patent Laid-open No. 150825/1991 previously filed by the present applicant discloses a technique for forming a deposition layer comprising titanium nitride on the surface of high-purity aluminum used as a cathode electrode by cathode arc deposition process, so as to increase the capacitance value of the cathode side, in the light of the finding that the capacitance of electrolytic capacitor is the composite capacitance based on the capacitance of the anode side and the capacitance of the cathode side in serial connection.

Problems to be Solved

However, solid electrolytic capacitors using the cathode foils formed by the conventional techniques described above have the following drawbacks. More specifically, the surface of aluminum foil as a fundamental material for electrodes of conventional solid electrolytic capacitors is etching processed, so as to increase the capacitance of the electrolytic capacitors. When etching is processed too excessively, the solubilization of the surface of the aluminum foil concurrently progresses, which adversely blocks the increase of the surface enlargement ratio. On the basis of such reason, the increase of the capacitance of electrode material by etching technique is limited.

Additionally, the technique for forming a deposition layer comprising titanium nitride on the surface of cathode foil is also problematic. More specifically, manganese dioxide formed via thermal decomposition of manganese nitrate has mainly been used as the solid electrolyte of conventional solid electrolytic capacitors. During the process of forming manganese dioxide, however, thermal treatment at 200 to 300 °C. should be carried out several times. Therefore, oxide film is formed on the surface of the metal nitride film formed on the surface of the cathode foil, which causes the reduction of the capacitance of the cathode foil, leading to the reduction of the capacitance of the electrolytic capacitor. Furthermore, ESR reduction is limited, because manganese dioxide has a relatively high electric conductivity.

Objects of the Invention

The present invention has been proposed so as to overcome the problems of the conventional techniques. It is a first object of the invention to provide a solid electrolytic capacitor with improved capacitance occurrence ratio and a method for producing the same. It is a second object of the invention to provide a solid electrolytic capacitor not only with improved capacitance occurrence ratio but also with reduced ESR, and a method for producing the same.

DISCLOSURE OF THE INVENTION

Figure 1:
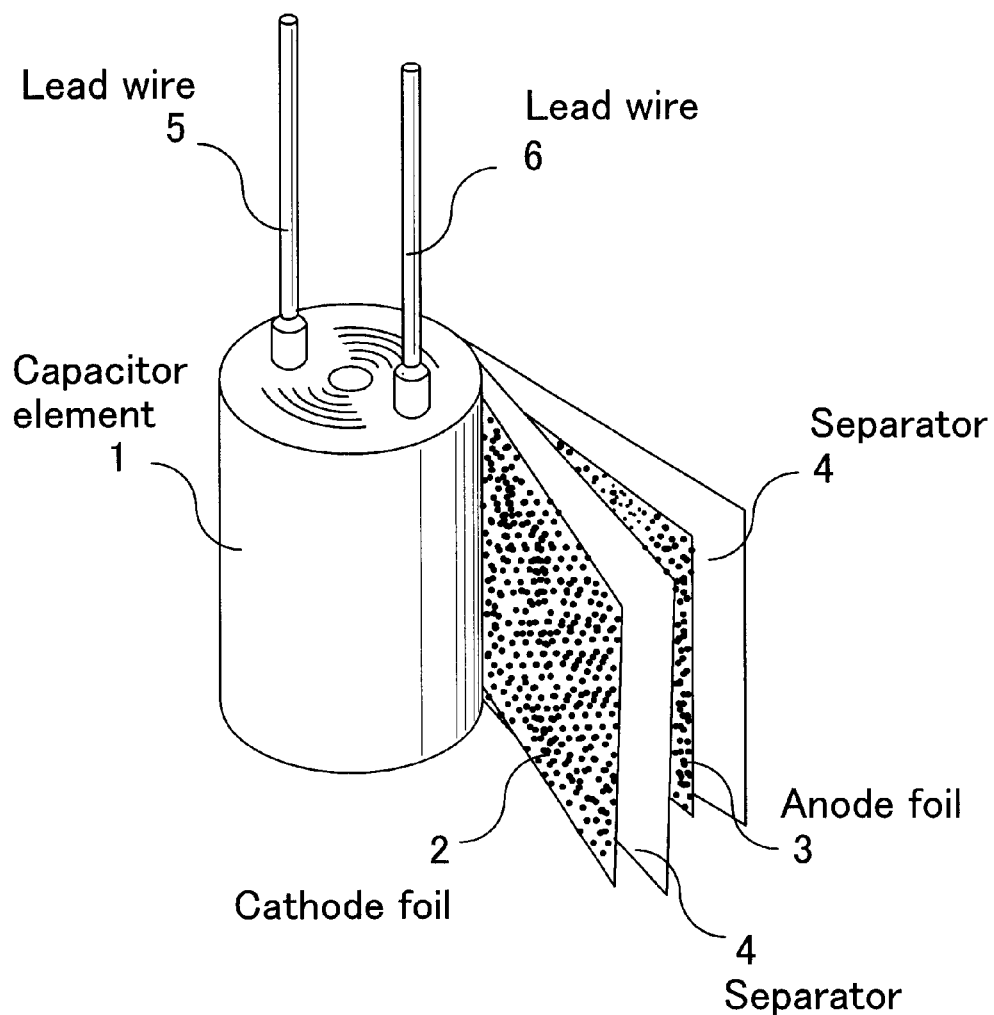
FIG. 1 is a schematic perspective view of the winding of the capacitor element.

So as to overcome the problems, the present inventor has made investigations about a solid electrolytic capacitor with reduced ESR and improved capacitance occurrence ratio and a method for producing the same. Consequently, the invention has been achieved.

The inventor has found that the capacitance occurrence ratio of a solid electrolytic capacitor of a winding type, using a conductive polymer or lead dioxide as the electrolyte layer, can greatly be improved by forming a film comprising metal nitride on the surface of the cathode foil.

The inventor has also found that ESR of a solid electrolytic capacitor of a winding type, using a conductive polymer or lead dioxide as the electrolyte layer, can be reduced together with the improvement of the capacitance occurrence ratio, by forming a chemical film on the surface of the cathode foil and additionally forming a film made of a metal nitride thereon by deposition process.

First, the inventor has made various investigations about a solid electrolytic capacitor of a winding type, using a conductive polymer with a high electric conductivity and good adhesion to dielectric films. As representative examples of the conductive polymer, the following have been known: polyethylene dioxythiophene (referred to as PEDT hereinafter), polypyrrole, polyaniline or derivatives thereof. Furthermore, the inventor has made various investigations about a solid electrolytic capacitor of a winding type, using lead dioxide known as an inorganic conductive compound.

Additionally, the inventor produced a capacitor, using a cathode foil with TiN deposited on the surface thereof, under the conditions as described later. The inventor then measured the capacitance of the cathode foil alone. The capacitance was infinite. More specifically, the inventor found that TiN deposited on the surface of the cathode foil and the metal of the cathode foil were in continuity.

Furthermore, the inventor formed a chemical film on the cathode foil at variable chemical voltages and additionally deposited and formed TiN thereon. Using the resulting cathode foil, the inventor made a capacitor under the conditions as described later, to measure the capacitance of the cathode foil alone. The capacitance was infinite. More specifically, the inventor found that TiN formed on the chemical film removed a part of the chemical film formed on the surface of the cathode foil, so that TiN and the metal of the cathode foil were in continuity.

Meanwhile, the capacitance C of electrolytic capacitor is the composite capacitance based on the capacitance Ca of the anode side and the capacitance Cc of the cathode side in serial connection, as expressed by the following equations.

$$1/C = 1/Ca + 1/Cc \therefore C = (Ca \times Cc)/(Ca+Cc) = Ca \times 1/(Ca/Cc+1)$$

As apparently shown by the aforementioned equations, the capacitance C of the capacitor is smaller than the capacitance Ca of the anode side, as long as Cc has a value (the cathode foil has a capacitance). In other words, the capacitance component of the cathode foil is eliminated if the capacitance Cc of the cathode foil is infinite, owing to the continuity between the TiN deposited on the surface of the cathode foil and the metal of the cathode foil. Thus, the capacitance C as the composite capacitance based on the capacitances of serially connected anode foil and cathode foil is equal to the capacitance Ca of the anode side. Hence, the capacitance C is at maximum.

The metal nitride to be used, further, may be TiN, ZrN, TaN, NbN and the like, where oxide film is hardly formed on the surface. The film to be formed on the surface of the cathode is not limited to the metal nitride but may comprise another conductive material if it has the film forming potency and a small oxidizability. For example, Ti, Zr, Ta and Nb and the like can be used as such a material.

Additionally, the method for forming a film made of a metal nitride on the, cathode made of a valve metal preferably, is preferably deposition process, viewed in the lights of the strength of the formed film, the adhesion thereof to the cathode, and the control of filming conditions. Cathode arc plasma deposition process is particularly more preferable.

The conditions applied to the cathode arc plasma deposition process are as follows. The electric current is at a value of 80A to 300A and the voltage is at a value of 15V to 20V. If the metal nitride is used, the cathode arc plasma deposition process is carried out by heating the cathode made of a valve metal to 200° C. to 450° C. in an atmosphere at the whole pressure including nitrogen of $1 \times 10^{-1}$ to $1 \times 10^{-4}$ Torr.

The chemical voltage applied for the formation of the chemical film on the surface of the cathode foil is preferably 10 V or less. The reason is as follows. When the chemical voltage is 10 V or more, the thickness of the chemical film formed on the surface of the cathode foil increases, to reduce the capacitance of the cathode foil, so that the capacitor capacitance as the composite capacitance based on the capacitances of the anode foil and the cathode foil decreases.

The chemical solution of the cathode foil to be used, additionally, may be chemical solutions of phosphates, such as ammonium dihydrogen phosphate and ammonium hydrogen phosphate; chemical solutions of borates, such as ammonium borate; and chemical solutions of adipates, such as ammonium adipate. Among them, preferably, ammonium dihydrogen phosphate is used. Additionally, the concentration of aqueous solution of ammonium dihydrogen phosphate is suitably at 0.005% to 3%.

The conductive polymer as described above, further, may be PEDT, polypyrrole, polyaniline or derivatives thereof, because these polymers never require high-temperature treatment during the process of capacitor production. Among them, PEDT is preferably used for capacitors of small-sized, winding type and large capacitance, because PEDT is polymerizable around 100° C. and allows ready temperature control during the process of capacitor production and has excellent thermal resistance and the largest capacitance per unit volume.

Capacitor Using Conductive Polymer as Solid Electrolyte

Continuously, a first method for producing a solid electrolytic capacitor of a winding type is described, where a conductive polymer is used as the electrolyte layer. Herein, the first method can achieve the first object of the invention.

The cathode foil to be used may be produced by forming a TiN film on the etched aluminum foil by cathode arc plasma deposition process. Further, the conditions of the cathode arc plasma deposition process are as follows. Using a Ti target in nitrogen atmosphere and heating the cathode made of a valve metal to 200° C. to 450° C., cathode arc plasma deposition is executed at the whole pressure including nitrogen of $1 \times 10^{-1}$ to $1 \times 10^{-4}$ Torr and at 80A to 300A and 15V to 20V. The anode foil to be used may be produced by forming a dielectric film on the surface of the etched aluminum foil by a chemical process according to a conventional method. Winding the anode foil together with the cathode foil and a separator, a capacitor element is formed, which is then impregnated with ethylene dioxythiophene (referred to EDT hereinafter) and subsequently with a 40% to 60% solution of ferric p-toluenesulfonate in butanol, followed by heating at 20° C. to 180° C. for 30 minutes or more. Thereafter, the surface of the capacitor element is coated with a resin, for aging.

Continuously, a second method for producing a solid electrolytic capacitor is described, where a conductive polymer is used as the electrolyte layer. The second method can achieve the second object of the invention.

The cathode foil to be used may be produced by subjecting an etched aluminum foil to a chemical treatment with an aqueous 0.005% to 3% solution of ammonium dihydrogen phosphate at 10 V or less and forming a TiN film on the surface thereof by cathode arc plasma deposition process. Further, the conditions of the cathode arc plasma deposition process are as follows. Using a Ti target in nitrogen atmosphere and heating the cathode made of a valve metal to 200° C. to 450° C., cathode arc plasma deposition is executed at the whole pressure including nitrogen of $1 \times 10^{-1}$ to $1 \times 10^{-4}$ Torr and at 80A to 300A and 15V to 20V. The anode foil to be used may be produced by forming a dielectric film on the surface of the etched aluminum foil by a chemical process according to a conventional method. Winding the anode foil together with the cathode foil and a separator, a capacitor element is formed, which is then impregnated with EDT and subsequently with a 40% to 60% solution of ferric p-toluenesulfonate in butanol, followed by heating at 20° C. to 180° C. for 30 minutes or more. Thereafter, the surface of the capacitor element is coated with a resin, for aging.

As the EDT for use in the impregnation of the capacitor element, herein, EDT monomer may be used. A monomer solution of a mixture of EDT and a volatile solvent at a volume ratio of 1:1 to 1:3 may also be used.

The volatile solvent to be used, additionally, may be hydrocarbons such as pentane; ethers such as tetrahydrofuran; esters such as ethyl formate; ketones such as acetone; alcohols such as methanol; and nitrogen compounds such as acetonitrile. Among them, preferable are methanol, ethanol and acetone.

The oxidant to be used, further, may be ferric p-toluenesulfonate dissolved in butanol. In this case, satisfactorily, the ratio of butanol to ferric p-toluenesulfonate is arbitrary. In accordance with the invention, the 40% to 60% solution is used. Further, the ratio of EDT to the oxidant blended together is preferably within the range of 1:3 to 1:6.

FIG. 1 depicts the solid electrolytic capacitor produced in accordance with the invention, which is essentially produced by the following procedures.

Figure 2:
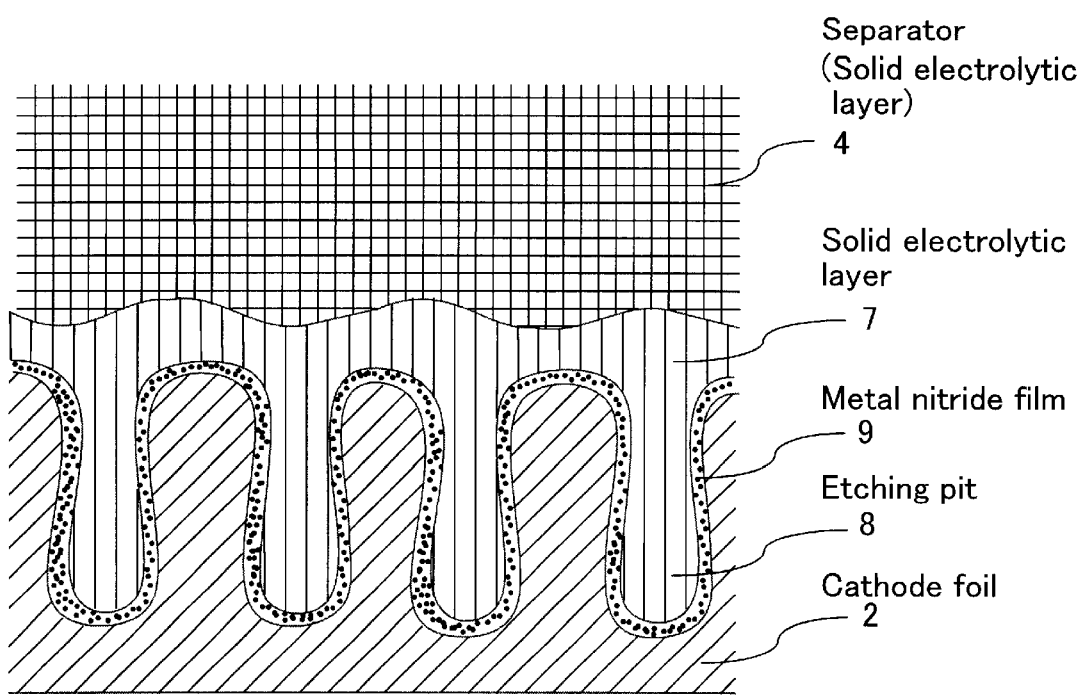
FIG. 2 is a schematic cross-sectional view for the separator, electrolytic layer, and etched cathode foil.
Figure 3:
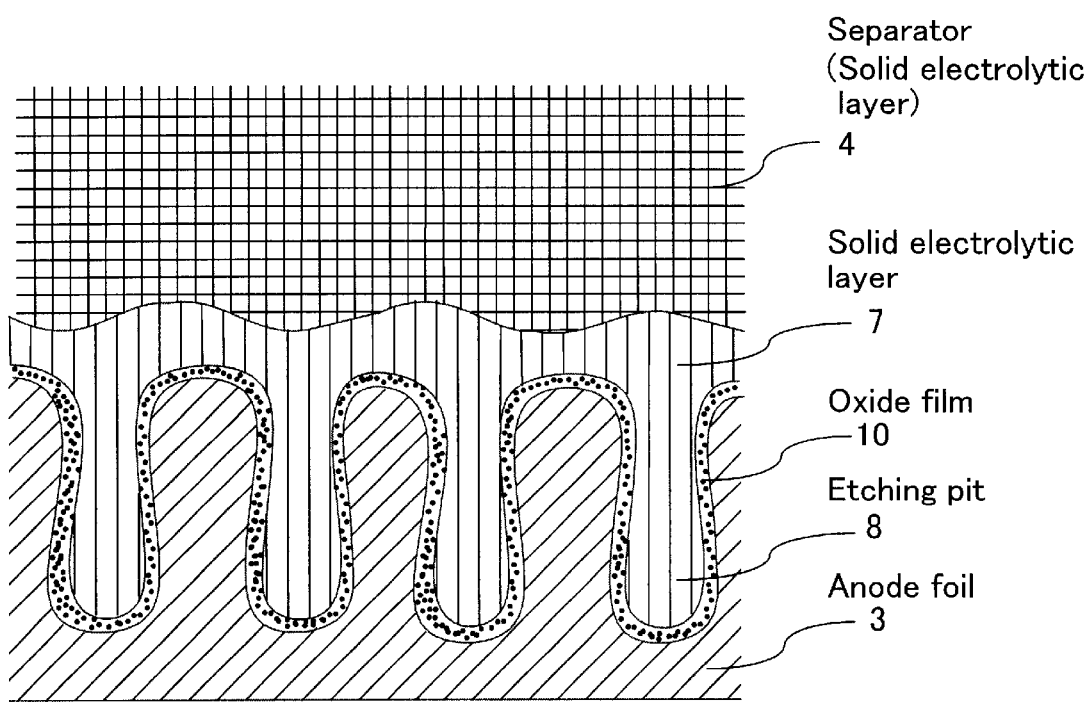
FIG. 3 is a schematic cross-sectional view of the separator, electrolytic layer, and etched anode foil.

First, a capacitor element 1 is provided by winding together a cathode foil 2 and an anode foil 3 via a separator 4, with lead wires t and 6 connected to the cathode foil 2 and the anode foil 3, respectively. Then, the capacitor element 1 is impregnated with ethylenedioxythiopene and an oxidant, through chemical polymerization in the capacitor element 1, solid electrolytic layer 7 made of polyethelenedioxythiopene is formed. As shown in FIGS. 2 and 3, the solid electrolytic layer 7 is supported with the separator 4.

The cathode foil 2 is made of a valve metal, such as aluminum, as shown in FIG. 2, the surface thereof is roughened by etching process to form numerous etching pits 8. Further, a metal nitride film 9, such as TiN film is formed on the etched cathode foil 2 by cathode arc plasma deposition process.

The anode foil 3 is made of a valve metal, such as aluminum, as shown in FIG. 3, the surface thereof is roughened by etching process to form numerous etching pits 8. Further, an oxide film 10 is formed on the etched anode foil by a conventional method.

The lead wires 5 and 6 are made of aluminum and the like and form outer connection parts responsible for the electrical connection of the cathode foil 2 and the anode foil 3 to the outside. The lead wires 5 and 6 are drawn out from the end face of the wound capacitor element 1.

Capacitor Using Lead Dioxide as Solid Electrolyte

In the same manner as the capacitor using conductive polymer, further, the inventor has made various investigations about a solid electrolytic capacitor of a winding type, using lead dioxide capable of forming a semiconductor layer at low temperature. Like the solid electrolytic capacitors having an electrolyte layer made of a conductive polymer, the inventor founds that the resulting solid electrolytic capacitor could have good voltage-resistant properties and great leakage current properties, where ESR reduction could be attained, involving high capacitance occurrence ratio.

Since lead dioxide forms a highly conductive semiconductor layer, a solid electrolytic capacitor with low ESR properties can be formed. Additionally, the semiconductor layer using lead dioxide can be formed by oxidizing lead acetate with oxidants such as ammonium persulfate at ambient temperature. Therefore, less damage occurs on anode oxide film, compared with manganese dioxide formed at high temperature. Thus, it is believed that the resulting solid electrolytic capacitor has great voltage-resistant properties and good leakage current properties at the same levels as those made using the conductive polymer.

Compared with PEDT described above, however, lead dioxide is disadvantageously at a rated voltage lower than the chemical voltage of the anode foil. So as to increase the rated voltage to the same level as the rated voltage of PEDT, the chemical voltage of the anode foil should be increased higher. Correspondingly, the thickness of the chemical film of the anode foil is enlarged, to cause the reduction of the capacitance of the anode foil. Hence, the capacitor capacitance as the composite capacitance based on the capacitance of the anode foil and the capacitance of the cathode foil is reduced.

Continuously, the first method for producing the solid electrolytic capacitor of a winding type is described, where lead dioxide is used as the electrolyte layer. Further, the first method can achieve the first object of the invention.

The cathode foil to be used, more specifically, may be produced by forming a TiN film on the etched aluminum foil by cathode arc plasma deposition process. Further, the conditions of the cathode arc plasma deposition process are as follows. Using a Ti target in nitrogen atmosphere and heating the cathode made of a valve metal to 200° C. to 450° C., cathode arc plasma deposition is effected at the whole pressure including nitrogen of $1 \times 10^{-1}$ to $1 \times 10^{-4}$ Torr and at 80A to 300A and 15V to 20V. The anode foil to be used, further, may be produced by forming a dielectric film on the surface of the etched aluminum foil by a chemical process according to a method conventionally used. Winding the anode foil together with the cathode foil and a separator, a capacitor element is formed, which is then impregnated with an aqueous lead acetate solution within a concentration range of 0.05 mol/liter to the saturation solubility, followed by addition of an aqueous ammonium persulfate solution within a range of 0.1 to 5 moles per one mole of lead acetate. The resulting capacitor element is left to stand at ambient temperature for 30 minutes to 2 hours, to form a lead acetate layer on the dielectric layer. Subsequently, the capacitor element is rinsed in water and dried, followed by sealing with a resin, to form a solid electrolytic capacitor.

Continuously, a second method for producing a solid electrolytic capacitor of a winding type is described, where lead dioxide is used as the electrolyte layer. The second method can achieve the second object of the invention.

The cathode foil to be used, more specifically, may be produced by chemically treating an etched aluminum foil in an aqueous 0.005% to 3% ammonium dihydrogen phosphate solution at 10V or less and forming a TiN film on the surface by cathode arc plasma deposition process. Further, the conditions of the cathode arc plasma deposition process are as follows. Using a Ti target in nitrogen atmosphere and heating the cathode made of a valve metal to 200° C. to 450° C., cathode arc plasma deposition is effected at the whole pressure including nitrogen of $1\times10^{-1}$ to $1\times10^{-4}$ Torr and at 80A to 300A and 15V to 20V. The anode foil to be used, further, may be produced by forming a dielectric film on the surface of the etched aluminum foil by a chemical process according to a method conventionally used. Winding the anode foil together with the cathode foil and a separator, a capacitor element is formed, which is then impregnated with an aqueous lead acetate solution within a concentration range of 0.05 mol/liter up to the saturation solubility, to which is then added an aqueous ammonium persulfate solution within a range of 0.1 to 5 moles per one mole of lead acetate. The resulting capacitor element is left to stand at ambient temperature for 30 minutes to 2 hours, to form a lead dioxide layer on the dielectric layer. Subsequently, the resulting capacitor element is rinsed in water and dried, followed by sealing with a resin, to form a solid electrolytic capacitor.

When the cathode foil in accordance with the invention is used for an electrolytic capacitor using general electrolytic solutions, an electric double-layer capacitor is formed in the interface between the electrolytic solution and the cathode foil, to function as a capacitance component. Thus, the capacitance of the cathode foil is never zero, so that the maximum capacitance as attained in accordance with the invention can never be yielded.

BEST MODE FOR CARRYING OUT THE INVENTION

The present invention will further be described in the following examples.

1. First Embodiment

The present embodiment relates to a solid electrolytic capacitor of a winding type, using a conductive polymer as the electrolyte layer. Further, the inventive cathode foil with a film comprising the metal nitride as formed on the surface thereof was produced below in inventive example 1. Additionally, a conventional cathode foil was used as conventional example 1 according to related art.

INVENTION EXAMPLE 1

High-purity aluminum foil (at purity of 99% and thickness of 50 $\mu$m) cut into pieces of 4 mm×30 mm was used as a material to be treated. After etching process, TiN film was formed by cathode arc plasma deposition process. Further, the conditions of the cathode arc plasma deposition process are as follows. Using a Ti target in nitrogen atmosphere and heating high-purity aluminum foil to 200° C., cathode arc plasma deposition was effected at $5\times10^{-3}$ Torr and at 300A and 20V. Subsequently winding the anode foil together with the cathode foil and a separator, a capacitor element of an element shape of $4\phi\times7L$ was formed, which was then impregnated with the EDT monomer and subsequently with a 45% solution of ferric p-toluenesulfonate in butanol as an oxidant solution, followed by heating at 100° C. for one hour. Subsequently, the surface of the capacitor element was coated with a resin for aging, to form a solid electrolytic capacitor. The rated voltage of the solid electrolytic capacitor is 6.3WV and the rated capacity thereof is 33 $\mu$F.

Convention Example 1

Using the same material to be treated as in inventive example 1, a cathode foil without any film made of a metal nitride as formed on the surface was used. Using the cathode foil, then, a solid electrolytic capacitor was formed in the same manner as inventive example 1.

Results of Comparison

The electrical properties of the solid electrolytic capacitors of inventive example 1 and the conventional example 1 of related art, as produced by the aforementioned methods, are shown in Table 1.

TABLE 1

|  | Cathode foil | Cap ($\mu$F) | tan $\delta$ (120 Hz) | ESR (m$\Omega$) (100 kHz) |
| --- | --- | --- | --- | --- |
| Conventional example 1 | conventional cathode foil | 30.2 | 0.120 | 49 |
| Inventive example 1 | TiN deposited | 47.8 | 0.027 | 47 |

As apparently shown in Table 1, the capacitance (Cap) in the conventional example 1 of related art using the cathode foil without any film made of a metal nitride as formed on the surface thereof was as small as 30.2, while tan $\delta$ was as large as 0.120. In inventive example 1, on contrast, Cap was 47.8, which is about 1.6-fold that of the conventional example 1 of related art, while tan $\delta$ was reduced to about 22.5% of the tan $\delta$ of the conventional example 1 of the related art. Additionally, the equal serial resistance (ESR) values were individually 49 and 47, with no significant difference.

The reason why the Cap of inventive example 1 is about 1.6-fold that of the conventional example 1 of related art is as follows. Since the film comprising the metal nitride was formed on the surface of the cathode foil, the cathode foil and the metal nitride were in continuity, so that the capacitance of the cathode foil is infinite, resulting in the elimination of the capacitance component of the cathode foil. This permitted the capacitor capacitance as the composite capacitance based on the capacitances of the anode foil and the cathode foil in serial connection to reach the maximum.

The reason why the tan $\delta$ in inventive example 1 was reduced to about 22.5% of the tan $\delta$ in the conventional example 1 of related art is as follows. Since no high-temperature treatment was done at the process of producing the capacitor, no oxide film was formed on the surface of the metal nitride deposited on the surface of the cathode foil. Thus, presumably, the dielectric loss of the oxide film was eliminated.

As described above, it is shown that the capacitance occurrence ratio of the solid electrolytic capacitor using the cathode foil with the film comprising the metal nitride as formed on the surface thereof can be improved greatly.

Furthermore, the inventor has verified that a solid electrolytic capacitor using TiN deposited on the cathode foil and manganese dioxide as the solid electrolyte has a reduced capacitance after the thermal treatment process.

2. Second Embodiment

The present embodiment relates to a winding-type solid electrolytic capacitor using lead dioxide as the electrolyte layer. Furthermore, the cathode foil with a film comprising the metal nitride as formed on the surface, in accordance with the invention, was produced below in inventive example 2. Additionally, a conventional cathode foil was used in the conventional example 2 according to related art.

INVENTIVE EXAMPLE 2

High-purity aluminum foil (at purity of 99% and thickness of 50 μm) cut into pieces of 4 mm×30 mm was used as a material to be treated. After etching process, TiN film was formed by cathode arc plasma deposition process. Further, the conditions of the cathode arc plasma deposition process are as follows. Using a Ti target in nitrogen atmosphere and heating high-purity aluminum foil to 200° C., cathode arc plasma deposition was effected at $5 \times 10^{-3}$ Torr and at 300A and 20V. Subsequently winding the anode foil together with the cathode foil and a separator, a capacitor element of an element shape of 4φ×7L was formed, which was then impregnated with aqueous 3 mol/liter lead acetate solution, followed by addition of the same volume of aqueous 3 mol/liter ammonium persulfate solution, which was then left to stand at ambient temperature for one hour. Subsequently, the capacitor element was rinsed in water and dried, to produce a solid electrolytic capacitor of a rated voltage of 6.3WV and a rated capacity of 22 μF in the same manner as in inventive example 1.

Compared with inventive example 1 using PEDT, the rated capacity in inventive example 2 was as small as 22 μF. The reason is as follows. Compared with PEDT, more specifically, lead dioxide causes the rated voltage of capacitor lower than the chemical voltage of anode foil. At the same rated voltage, therefore, the chemical voltage of the anode foil should be increased in case of lead dioxide. Hence, the thickness of the anode foil is enlarged, causing the reduction of the capacitance of the anode foil and thus leading to the reduction of the capacitor capacitance as the composite capacitance based on the capacitance of the anode foil and the capacitance of the cathode foil.

Conventional Example 2

Using the same material to be treated as that in inventive example 2, a cathode foil with no film made of a metal nitride as formed on the surface was used. Using the cathode foil, then, a solid electrolytic capacitor was formed in the same manner as in inventive example 2.

Results of Comparison

The electrical properties of the solid electrolytic capacitors of inventive example 2 and the conventional example 2 of related art, as produced by the aforementioned methods, are shown in Table 2.

TABLE 2

|  | Cathode foil | Cap (μF) | tan δ (120 Hz) | ESR (mΩ) (110 kHz) |
|---|---|---|---|---|
| Conventional example 2 | conventional cathode foil | 22.1 | 0.132 | 159 |
| Inventive example 2 | TiN deposited | 25.2 | 0.042 | 156 |

As apparently shown in Table 2, the capacitance (Cap) in the conventional example 2 of related art, using a cathode foil with no film made of a metal nitride as formed on the surface thereof was as small as 22.1, while tan δ was as large as 0.132. In inventive example 2, alternatively, Cap was 25.2 of a value larger by about 14% than the Cap in the conventional example 2 of related art, while tan δ was reduced to 0.042, which was at about 30% of the tan δ of the conventional example 2 of the related art. Additionally, the equal serial resistance (ESR) values were individually 159 and 156, with no significant difference.

The reason why the Cap of inventive example 2 is about 1.14-fold that of the conventional example 2 of related art is as follows. Since the film comprising the metal nitride was formed on the surface of the cathode foil, the cathode foil and the metal nitride were in continuity, so that the capacitance of the cathode foil is infinite, resulting in the elimination of the capacitance component of the cathode foil. This permitted the capacitor capacitance as the composite capacitance based on the capacitances of the anode foil and the cathode foil in serial connection to reach the maximum.

The reason why the capacitance increment (about 14%) in inventive example 1 is smaller than the capacitance increment (about 60%) in inventive example 2 using PEDT is as follows. As described above, more specifically, the chemical voltage of the anode foil in inventive example 2 should be set high when the rated voltage in inventive example 2 is set at the same level as in inventive example 1, which causes the enlargement of the thickness of the anode foil, involving the reduction of the capacitance of the anode foil. Even when the capacitance of the cathode foil is infinite via TiN deposition, therefore, the contribution to the capacitor capacitance as the composite capacitance based on the capacitance of the anode foil and the capacitance of the cathode foil is smaller than the contribution in inventive example 1 using PEDT.

Since no high-temperature treatment was done at the process of producing the capacitor, with the resultant no formation of any oxide film on the surface of the metal nitride deposited on the surface of the cathode foil, involving the elimination of the dielectric loss of the oxide film, the tan δ in inventive example 1 was reduced to about 30% of the tan δ in the conventional example 2 of related art.

As described above, it is shown that a solid electrolytic capacitor using lead dioxide as the electrolyte is attained, having good voltage resistance and leakage current properties at a high capacitance occurrence ratio, as in the case of the solid electrolytic capacitor equipped with the electrolyte layer comprising the conductive polymer.

3. Third Embodiment

The present embodiment relates to a winding-type solid electrolytic capacitor using a conductive polymer as the electrolyte layer. Furthermore, the cathode foil with a chemical film formed on the surface and a film made of a metal nitride as formed on the surface in accordance with the invention was produced below in inventive example 3. Additionally, a cathode foil only with a chemical film formed on the surface of the cathode foil at the same chemical voltage as in inventive example 3 was used as comparative example 3. A conventional cathode foil was used in the conventional example 3 according to related art.

INVENTIVE EXAMPLE 3

High-purity aluminum foil (at purity of 99% and thickness of 50 μm) cut into pieces of 4 mm×30 mm was used as a material to be treated. After etching process, the processed material was subjected to chemical treatment in aqueous 0.15% ammonium dihydrogen phosphate solution at a chemical voltage of 2V, followed by formation of TiN film on the surface thereof by cathode arc plasma deposition process. Further, the conditions of the cathode arc plasma deposition process are as follows. Using a Ti target in nitrogen atmosphere and heating high-purity aluminum foil to 200° C., cathode arc plasma deposition was effected at $5 \times 10^{-3}$ Torr and at 300A and 20V. Subsequently winding the anode foil together with the cathode foil and a separator, a capacitor element of an element shape of 4φ×7L was formed, which was then impregnated with the EDT monomer, followed by impregnation with a 45% solution of ferric p-toluenesulfonate in butanol, for heating at 100° C. for one hour. Subsequently, the surface of the capacitor element was coated with a resin, followed by aging, to produce a solid electrolytic capacitor. The rated voltage of the solid electrolytic capacitor was 6.3WV, while the rated capacity thereof was 33 μF.

Comparative Example 3

Using the same material to be treated as in inventive example 3 for etching process, chemical treatment was done in aqueous 0.15% solution of ammonium dihydrogen phosphate at a chemical voltage of 2V, to produce a cathode foil. Using the cathode foil, then, a solid electrolytic capacitor was formed in the same manner as in inventive example 3.

Conventional Example 3

Using the same material to be treated as in inventive example 3, a cathode foil with no chemical film or no film made of a metal nitride as formed on the surface was used. Using the cathode foil, then, a solid electrolytic capacitor was formed in the same manner as in inventive example 3.

Results of Comparison

The electrical properties of the solid electrolytic capacitors of inventive example 3, comparative example 3 and the conventional example 3 of related art are shown in Table 3.

TABLE 3

|  | Cathode foil | Cap (μF) | tan δ (120 Hz) | ESR (mΩ) (100 kHz) |
|---|---|---|---|---|
| Conventional example 3 | conventional cathode foil | 30.2 | 0.120 | 49 |
| Comparative example 3 | only chemical film (2 V) | 32.1 | 0.088 | 35 |
| Inventive example 3 | chemical film (2 V) + TiN | 46.8 | 0.020 | 35 |

As apparently shown in Table 3, the capacitance (Cap) in the conventional example 3 of related art using a cathode foil with no chemical film or no film made of a metal nitride as formed on the surface thereof was as small as 30.2, while the equal serial resistance (ESR) and tan δ were as large as 49 and 0.120, respectively.

On contrast, Cap in inventive example 3 was 46.8, which was an increase of about 1.55 fold that in the conventional example 3 of related art, while tan δ therein was 0.020, which was a decrease of about 16.7% of that in the conventional example 3 of related art.

In comparative example 3 where only a chemical film was formed on the surface of the cathode foil, alternatively, Cap was 32.1, which was an increase of about 1.06 fold that in the conventional example 3 of related art, while tan δ therein was 0.088, which was a decrease of about 73.3% of that in the conventional example 3 of related art. Further, ESR was 35, which was a decrease of about 71.4% of that of the conventional example 3 of related art.

The reason why such results are yielded is as follows. In inventive example 3, more specifically, a film made of a metal nitride was formed on the chemical film formed on the surface of the cathode foil by the deposition process. The metal nitride removes a part of the chemical film formed on the surface of the cathode foil, so that the metal nitride and the cathode foil metal are in continuity. In the present embodiment, further, a conductive polymer is used as the electrolyte. Therefore, no high-temperature treatment is required during the process of producing the capacitor, so no oxide film is formed on the surface of the metal nitride.

In inventive example 3 as described above, the capacitance of the cathode foil is infinite because of the continuity of the metal nitride deposited on the surface of the cathode foil and the metal of the cathode foil, leading to the elimination of the capacitance component on the surface of the cathode foil. Consequently, the capacitor capacitance as the composite capacitance based on the capacitance of the anode foil and the capacitance of the cathode foil is equal to the capacitance of the anode foil alone, which causes the increase. Since of the elimination of the capacitance component of the cathode foil, the dielectric loss thereof is also eliminated, leading to the reduction of tan δ. In the present embodiment, no high-temperature treatment is needed during the process of producing the capacitor, because of the use of the conductive polymer as the electrolyte. Thus, no oxide film was formed on the surface of the metal nitride.

In inventive example 3 as described above, the continuity between the metal nitride deposited on the surface of the cathode foil and the cathode foil metal, leads to the infiniteness of the capacitance of the cathode foil. Consequently, the capacitor capacitance as the composite capacitance based on the capacitances of the anode foil and the cathode foil is equal to the capacitance of the anode foil alone, so that the capacitance is increased. Additionally, the elimination of the capacitance component of the cathode foil leads to the elimination of the dielectric loss thereof, causing the reduction of tan δ.

Further, the metal nitride is formed on the surface of the cathode foil by the deposition process, with the consequent formation of no metal nitride on the sides of the recess portions on the surface of the cathode foil etched. Thus, the conductive polymer and the cathode foil are directly in contact to leach other on the portions. However, a chemical film preliminary formed on the surface of the cathode foil improves the adhesion between the cathode foil and the conductive polymer, possibly reducing ESR and tan δ.

In comparative example 3 where only the chemical film is formed on the surface of the cathode foil, the increment of Cap is not so large as in inventive example 3. However, tan δ therein is reduced to about 73.3% of the conventional example 3 of related art, while ESR therein is reduced to about 71.4% of the conventional example 3 of related art. This reduction of ESR and tan δ may be due to the improvement of the adhesion between the cathode foil and the conductive polymer, owing to the formation of the chemical film at the given chemical voltage on the surface of the cathode foil.

As described above, it is shown that the ESR and tan δ of the solid electrolytic capacitor with the chemical film formed on the surface and the film comprising the metal nitride as formed thereon can be reduced and that the capacitance occurrence ratio thereof can remarkably be improved.

4. Fourth Embodiment

The present embodiment relates to a solid electrolytic capacitor of a winding type, using lead dioxide as the electrolyte layer. Additionally, the cathode foil with a chemical film formed on the surface thereof and a film made of a metal nitride as formed thereon was produced below in inventive example 4. In comparative example 4, further, a cathode foil was used, where a chemical film was singly formed on the surface of the cathode foil at the same chemical voltage as in inventive example 4. In the conventional example 4 according to related art, a conventional cathode foil was used.

INVENTIVE EXAMPLE 4

High-purity aluminum foil (at purity of 99% and thickness of 50 μm) cut into pieces of 4 mm×30 mm was used as a material to be treated. After etching process, the processed material was subjected to chemical treatment in aqueous 15% ammonium dihydrogen phosphate solution at a chemical voltage of 2V, followed by formation of TiN film on the surface thereof by cathode arc plasma deposition process. Further, the conditions of the cathode arc plasma deposition process are as follows. Using a Ti target in nitrogen atmosphere and heating high-purity aluminum foil to 200° C., cathode arc plasma deposition was effected at $5 \times 10^{-3}$ Torr and at 300A and 20V. Subsequently winding the anode foil together with the cathode foil, and a separator, a capacitor element of an element shape of 4φ×7L was formed, which was then impregnated with aqueous 3 mol/liter lead acetate solution, followed by addition of the same volume of aqueous 3 mol/liter ammonium persulfate solution. The resulting capacitor element was left to stand at ambient temperature for one hour. Subsequently, the capacitor element was rinsed in water and dried. In the same manner as in inventive example 1, then, a solid electrolytic capacitor at a rated voltage of 6.3WV and a rated capacity of 22 μF was formed.

Compared with inventive example 3 using PEDT, the rated capacity was as small as 22 μF in inventive example 4. The reason is as follows. Compared with PEDT, the rated voltage of the capacitor is lower than the chemical voltage of the anode foil, in case that lead dioxide is used. At the same rated voltage, therefore, the chemical voltage of the anode foil should be increased in case of lead dioxide, so that the thickness of the anode foil is increased while the capacitance of the anode foil is decreased, causing the reduction of the capacitor capacitance as the composite capacitance based on the capacitance of the anode foil and the capacitance of the cathode foil.

Comparative Example 4

Using the same material to be treated as in inventive example 4, the material was etching processed, followed by chemical treatment in aqueous 0.15% solution of ammonium dihydrogen phosphate at a chemical voltage of 2V, to produce a cathode foil. Using the cathode foil, then, a solid electrolytic capacitor was formed in the same manner as in inventive example 4.

Conventional Example 4

Using the same material to be treated as in inventive example 4, a cathode foil with no chemical film or no film made of a metal nitride as formed on the surface was used. Using the cathode foil, then, a solid electrolytic capacitor was formed in the same manner as in inventive example 4.

Results of Comparison

The electrical properties of the solid electrolytic capacitors of inventive example 4, comparative example 4 and the conventional example 4 of related art are shown in Table 4.

TABLE 4

| | Cathode foil | Cap (μF) | tan δ (120 Hz) | ESR (mΩ) (100 kHz) |
|---|---|---|---|---|
| Conventional example 4 | conventional cathode foil | 22.0 | 0.129 | 157 |
| Comparative example 4 | chemical film alone (2 V) | 23.1 | 0.092 | 138 |
| Inventive example 4 | chemical film (2 V) + TiN | 24.9 | 0.033 | 136 |

As apparently shown in Table 4, the capacitance (Cap) in the conventional example 4 of related art, using a cathode foil with no chemical film or no film made of a metal nitride as formed on the surface thereof, was as small as 22.0, while the equal serial resistance (ESR) and tan δ were as large as 157 and 0.129, respectively.

On contrast, Cap in inventive example 4 was 24.9, which was larger by about 13% than that in the conventional example 2 of related art, while tan δ therein was 0.033, as small as about 26% of that in the conventional example 4 of related art. Additionally, ESR was 136, as small as about 87% of that in the conventional example 4 of related art.

In comparative example 4 where only a chemical film was formed on the surface of the cathode foil, alternatively, Cap was 23.1, which was larger by about 5% than that in the conventional example 4 of related art, while tan δ therein was 0.092, as small as about 71% of that in the conventional example 4 of related art. Further, ESR was 138, as small as about 88% of that of the conventional example 4 of related art.

The reason why such results are yielded is as follows. In inventive example 4, more specifically, a film made of a metal nitride was formed on the chemical film formed on the surface of the cathode foil by the deposition process. The metal nitride removes a part of the chemical film formed on the surface of the cathode foil, so that the metal nitride and the cathode foil metal are in continuity. In the present embodiment, further, lead dioxide is used as the electrolyte. Therefore, no high-temperature treatment is required during the process of producing the capacitor, so no oxide film is formed on the surface of the metal nitride.

In inventive example 4 as described above, the capacitance of the cathode foil is infinite because of the continuity of the metal nitride deposited on the surface of the cathode foil and the metal of the cathode foil, leading to the elimination of the capacitance component on the surface of the cathode foil. Consequently, the capacitor capacitance as the composite capacitance based on the capacitance of the anode foil and the capacitance of the cathode foil is equal to the capacitance of the anode foil alone, which causes the increase. Additionally, the elimination of the capacitance component of the cathode foil leads to the elimination of the dielectric loss thereof, causing the reduction of tan δ.

Further, the metal nitride is formed on the surface of the cathode foil by the deposition process, with no consequent formation of any metal nitride on the sides of the recesses on the surface of the cathode foil etched. Thus, lead dioxide and the cathode foil are directly in contact to each other on the portions. However, a chemical film preliminary formed on the surface of the cathode foil improves the adhesion between the cathode foil and the conductive polymer, possibly reducing ESR and tan δ.

The reason why the increment (about 13%) of the capacitance in inventive example 4 is smaller than the increment (about 55%) of the capacitance in inventive example 3 using PEDT is as follows. As described above, it is shown that the rated voltage in inventive example 4 if preset to the same rated voltage as in inventive example 3 essentially causes the increase of the chemical voltage of the anode foil, so that the thickness of the anode foil increases while the capacitance of the anode foil decreases. Thus, even if the capacitance of the cathode foil is infinite via TiN deposition, the contribution to the capacitor capacitance as the composite capacitance based on the capacitance of the anode foil and the capacitance of the cathode foil is possibly smaller than the contribution in inventive example 3 using PEDT.

In comparative example 4 with only a chemical film formed on the surface of the cathode foil, the increment of Cap is not so large as in inventive example 4, while the tan δ and ESR were reduced to about 71.3% and about 87.9%, respectively as in the conventional example 4 of related art. This reduction of ESR and tan δ is possibly due to the improvement of the adhesion between the cathode foil and lead dioxide because of the formation of the chemical film at the given chemical voltage on the surface of the cathode foil.

As described above, a solid electrolytic capacitor with a chemical film formed on the surface and a film made of a metal nitride as formed thereon can have reduced ESR and tan δ, as in the solid electrolytic capacitor equipped with an electrolyte layer made of a conductive polymer, even when lead dioxide is used as the electrolyte therein. Additionally, it is shown that the capacitance occurrence ratio can be improved remarkably.

Industrial Applicability

As described above, in a solid electrolytic capacitor produced by winding together a cathode foil made of a valve metal and an anode foil made of a valve metal with an oxide film formed on the surface via a separator to provide a capacitor element and forming an electrolyte layer made of a conductive polymer between the anode foil and the cathode foil, a film made of a metal nitride is formed on the surface of the cathode foil to put the film comprising the metal nitride and the cathode metal foil in continuity. In case that the capacitance of the cathode foil is consequently infinite, the capacitance component of the cathode foil is eliminated, leading to the capacitor capacitance equal to the capacitance of the anode side, which is maximal, so that the capacitance occurrence ratio of the capacitor can remarkably be improved.

In a solid electrolytic capacitor with an electrolyte layer made of lead dioxide between the cathode foil and the anode foil, furthermore, a film made of a metal nitride is formed on the surface of the cathode foil to put the film comprising the metal nitride and the cathode metal foil in continuity. Hence, the capacitance occurrence ratio of the capacitor can remarkably be improved.

In a solid electrolytic capacitor produced by winding together a cathode foil made of a valve metal and an anode foil made of a valve metal with an oxide film formed on the surface via a separator to provide a capacitor element, and forming an electrolyte layer made of a conductive polymer between the anode foil and the cathode foil, additionally, a chemical film is formed on the surface of the cathode foil and a film made of a metal nitride is formed thereon. Thus, the formed film comprising the metal nitride on the chemical film removes a part of the chemical film formed on the surface of the cathode foil, so that the film comprising the metal nitride and the cathode metal foil are in continuity. In case that the capacitance of the cathode foil is consequently infinite, the capacitance component of the cathode foil is eliminated, leading to the capacitor capacitance equal to the capacitance of the anode, which is maximal, so that the capacitance occurrence ratio of the capacitor can remarkably be improved.

The formation of the chemical film at the given chemical voltage on the surface of the cathode foil improves the adhesion between the cathode foil and the conductive polymer, possibly leading to the reduction of ESR.

In a solid electrolytic capacitor with an electrolyte layer made of lead dioxide as formed between the cathode foil and the anode foil, still additionally, a chemical film is formed on the surface of the cathode foil and a film made of a metal nitride is formed thereon. Accordingly, the film comprising the metal nitride as formed on the chemical film partially removes a part of the chemical film formed on the surface of the cathode foil, so that the film comprising the metal nitride and the cathode metal foil are in continuity. Thus, the capacitance occurrence ratio of the capacitor can be improved greatly. Additionally, the formation of the chemical film at the given chemical voltage on the surface of the cathode foil can improve the adhesion between the cathode foil and lead dioxide, possibly leading to ESR reduction.

What is claimed is:

1. A solid electrolytic capacitor produced by winding together a cathode foil made of a valve metal and an anode foil made of a valve metal with an oxide film formed on the surface via a separator to provide a capacitor element and forming an electrolyte layer made of a conductive polymer between the cathode foil and the anode foil, said capacitor comprising:

a film made of a metal nitride formed on the surface of the cathode foil in such a manner that a part of an oxide film spontaneously formed on the surface of the cathode foil is partially removed to allow the cathode foil and the film of the metal nitride to be in continuity.

2. A solid electrolytic capacitor produced by winding together a cathode foil made of a valve metal and an anode foil made of a valve metal with an oxide film formed on the surface via a separator to provide a capacitor element and forming an electrolyte layer made of lead dioxide between the cathode foil and the anode foil, said capacitor comprising:

a film made of a metal nitride formed on the surface of the cathode foil in such a manner that a part of an oxide film spontaneously formed on the surface of the cathode foil is partially removed to allow the cathode foil and the film of the metal nitride to be in continuity.

3. A solid electrolyte capacitor produced by winding together a cathode foil made of a valve metal and an anode foil made of a valve metal with an oxide film formed on the surface via a separator to provide a capacitor element and forming an electrolyte layer made of a conductive polymer between the cathode foil and the anode foil, said capacitor comprising:

an oxide film formed on the surface of the cathode foil by a chemical treatment; and a film made of a metal nitride formed on the oxide film in such a manner that a part of the oxide film on the surface of the cathode foil is partially removed to allow the cathode foil and the film of the metal nitride to be in continuity.

4. A solid electrolytic capacitor produced by winding together a cathode foil made of a valve metal and an anode foil made of a valve metal with an oxide film formed on the surface via a separator to provide a capacitor element and forming an electrolyte layer made of lead dioxide between the cathode foil and the anode foil, said capacitor comprising:

an oxide film formed on the surface of the cathode foil by a chemical treatment; and a film made of a metal nitride formed on the oxide film in such a manner that a part of the oxide film on the surface of the cathode foil is partially removed to allow the cathode foil and the film of the metal nitride to be in continuity.

5. A solid electrolytic capacitor according to claim 1, wherein the conductive polymer is polyethylene dioxythiophene.

6. A solid electrolytic capacitor according to claim 1, wherein the valve metal is aluminum.

7. A solid electrolytic capacitor according to claim 1, wherein the metal nitride is any of TiN, ZrN, TaN and NbN.

8. A solid electrolytic capacitor according to claim 1, wherein the metal nitride has been formed by deposition process.

9. A solid electrolytic capacitor according to claim 8, wherein the deposition process is cathode are plasma desposition process.

10. A method for producing a solid electrolytic capacitor, by winding together a cathode foil made of a valve metal and an anode foil made of a valve metal with an oxide film formed on the surface thereof via a separator to provide a capacitor element and forming an electrolyte layer made of a conductive polymer between the cathode foil and the anode foil, said method comprising the step of:

forming a film made of a metal nitride on the surface of the cathode foil in such a manner that a part of an oxide film spontaneously formed on the surface of the cathode foil is partially removed to allow the cathode foil and the film of the metal nitride to be in continuity.

11. A method for producing a solid electrolytic capacitor, by winding together a cathode foil made of a valve metal and an anode foil made of a valve metal with an oxide film formed on the surface thereof via a separator to provide a capacitor element and forming an electrolyte layer made of lead dioxide between the cathode foil and the anode foil, said method comprising the step of:

forming a film made of a metal nitride on the surface of the cathode foil in such a manner that a part of an oxide film spontaneously formed on the surface of the cathode foil is partially removed to allow the cathode foil and the film of the metal nitride to be in continuity.

12. A method for producing a solid electrolytic capacitor by winding together a cathode foil made of a valve metal and an anode foil made of a valve metal with an oxide film formed on the surface thereof via a separator to provide a capacitor element and forming an electrolyte layer made of a conductive polymer between the cathode foil and the anode foil, said method comprising the steps of:

forming an oxide film on the surface of the cathode foil by a chemical treatment; and forming a film made of a metal nitride on the oxide film in such a manner that a part of the oxide film on the surface of the cathode foil is partially removed to allow the cathode foil and the film of the metal nitride to be in continuity.

13. A method for producing a solid electrolytic capacitor by winding together a cathode foil made of a valve metal and an anode foil made of a valve metal with an oxide film formed on the surface thereof via a separator to provide a capacitor element and forming an electrolyte layer made of lead dioxide between the cathode foil and the anode foil, said method comprising the steps of:

forming an oxide film on the surface of the cathode foil by a chemical treatment; and forming a film made of a metal nitride on the oxide film in such a manner that a part of the oxide film on the surface of the cathode foil is partially removed to allow the cathode foil and the film of the metal nitride to be in continuity.

14. A solid electrolytic capacitor according to claim 3, wherein the conductive polymer is polyethylene dioxythiophene.

15. A solid electrolytic capacitor according to claim 2, wherein the valve metal is aluminum.

16. A solid electrolytic capacitor according to claim 3, wherein the valve metal is aluminum.

17. A solid electrolytic capacitor according to claim 4, wherein the valve metal is aluminum.

18. A solid electrolytic capacitor according to claim 2, wherein the metal nitride is any of TiN, ZrN, TaN and NbN.

19. A solid electrolytic capacitor according to claim 3, wherein the metal nitride is any of TiN, ZrN, TaN and NbN.

20. A solid electrolytic capacitor according to claim 4, wherein the metal nitride is any of TiN, ZrN, TaN and NbN.

21. A solid electrolytic capacitor according to claim 2, wherein the metal nitride has been formed by deposition process.

22. A solid electrolytic capacitor according to claim 3 wherein the metal nitride has been formed by deposition process.

23. A solid electrolytic capacitor according to claim 4, wherein the metal nitride has been formed by deposition process.

24. A solid electrolytic capacitor comprising:

a cathode foil formed of a valve metal with a metal nitride film formed on a surface of the cathode foil in such a manner that a part of an oxide film formed on the surface of the cathode foil is partially removed to allow the cathode foil and the film of the metal nitride to be in continuity;

an anode foil formed of a valve metal with an oxide film;

a separator between the cathode foil and the anode foil;

a first lead connected to the cathode foil; and a second lead connected to the anode foil.

25. The solid electrolytic capacitor according to claim 24, wherein the cathode foil, separator, and anode film are wound about each other.

26. The solid electrolytic capacitor according to claim 25, wherein the cathode foil and the anode foil are etched to provide microfine recesses and protrusions prior to depositing of respectively the metal nitride film and the oxide film.

27. The solid electrolytic capacitor according to claim 25, wherein the metal nitride film is selected from a group consisting of TiN, ZnN, TaN, and NbN.

28. The solid electrolytic capacitor according to claim 27, where the cathode foil is aluminum and the anode foil is aluminum.

29. A method for preparing a solid electrolytic capacitor comprising assembling a capacitor element by winding together a cathode foil comprising a valve metal and an anode foil comprising a valve metal with an oxide film prepared on a surface thereof through a separator to prepare an electrolyte layer made of one of conductive polymer and lead dioxide between the cathode film and the anode film, comprising the steps of:

forming a film layer on the surface of the cathode foil; and depositing a metal nitride layer on the film layer so that a part of the film layer on the surface of the cathode foil is partially removed to allow the cathode foil and the metal nitride to be in continuity so that any dielectric loss from the film layer is eliminated and a capacitance component of the cathode foil is eliminated.

30. The method of claim 29 wherein the metal nitride layer is formed by heating the cathode foil to a temperature between 200° C. and 450° C. and depositing a metal nitride film in a nitrogen atmosphere by an arc plasma deposition process.

31. A method for preparing a solid electrolytic capacitor comprising the steps of:

providing a cathode foil of aluminum;

forming a chemical film on the cathode foil by applying an aqueous solution of ammonium dihydrogen phosphate at a chemical voltage of approximately 2 volts;

heating the cathode foil to a temperature between 200° C. to 450° C.;

depositing a metal nitride film on the heated cathode foil by a cathode arc plasma deposition process in, a nitrogen atmosphere to provide a direct continuity between the metal nitride and the cathode foil;

providing an anode foil of a valve metal;

providing a separator;

winding the cathode foil, separator, and anode foil together to provide a capacitor element with terminals;

impregnating the capacitor element with an aqueous lead acetate solution;

impregnating the capacitor element with an aqueous ammonium persulfate solution; and sealing the impregnated capacitor element to provide the solid electrolytic capacitor.

* * * * *